United States Patent [19]
Minix

[11] 3,822,584
[45] July 9, 1974

[54] AIR FLOW GAGING DEVICE

[75] Inventor: William A. Minix, Detroit, Mich.

[73] Assignee: Freeland Gauge Company, Detroit, Mich.

[22] Filed: Nov. 9, 1972

[21] Appl. No.: 305,145

[52] U.S. Cl. ............................................. 73/37.9
[51] Int. Cl. ........................ G01b 13/10, G01m 3/26
[58] Field of Search ................... 73/37.5, 37.8, 37.9; 137/116.5

[56] References Cited
UNITED STATES PATENTS

| | | | |
|---|---|---|---|
| 2,687,743 | 8/1954 | Huber | 137/116.5 |
| 2,731,975 | 1/1956 | Boals | 137/116.5 |
| 2,777,458 | 1/1957 | Stern | 137/116.5 |
| 2,808,068 | 10/1957 | Thomas | 137/116.5 X |
| 3,170,318 | 2/1965 | Minix | 73/37.5 |

Primary Examiner—Richard C. Queisser
Assistant Examiner—Joseph W. Roskos
Attorney, Agent, or Firm—Cullen, Settle, Sloman & Cantor

[57] ABSTRACT

An air flow device for gaging bores or the predetermined dimension of a part wherein air leakage from a gage element within said bore or relative to such part is visibly measured and compared with air leakage of said gage element within a predetermined master bore or part of predetermined dimension thus, providing a range for the selection or rejection of work pieces. The air flow device has a valve body with an intake chamber for the delivery of low pressure air to and through an air tube for the moving of a float therein, as well as a delivery passage which receives the air flowing through said air tube adapted for connection to air gage tooling. A manifold within the valve body is connected to a source of high pressure air and has an outlet which connects to the high pressure chamber of an automatic air flow control device. The air flow control device includes a cylinder and a spring biased piston which define a low pressure chamber which communicates with said intake chamber and with a needle valve nested in said high pressure chamber engaged by said piston for determining air flow of low pressure from said cylinder.

8 Claims, 4 Drawing Figures

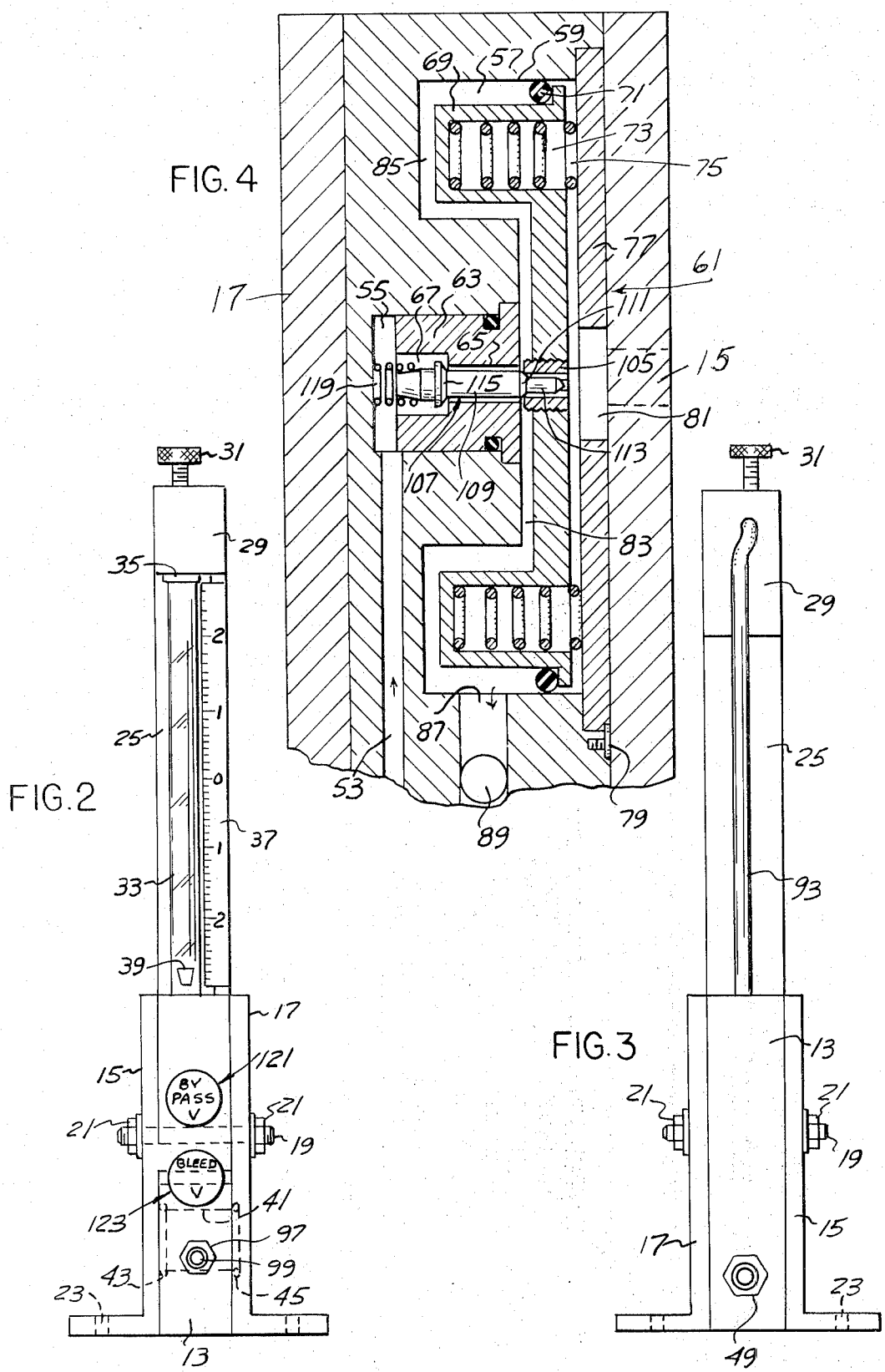

AIR FLOW GAGING DEVICE

BACKGROUND OF THE INVENTION

Heretofore in the use of air flow devices for the gaging of bores and dimensions employing air leakage, there have been employed the use of individual pressure regulators for each valve body. Conventional pressure regulators such as shown in my U.S. Pat. No. 3,170,318, have a tendancy for water and oil to accumulate therein with the ultimate deterioration of the diaphram and the delicate valve seats with resulting failure of the regulator.

Heretofore with the use of regulators, these are designed for the exact cut off of fluids such as the flow of pressure air and thus, if there is a fluctuation in the line pressure such as a temporary stoppage of air flow through the gage head, there will be a temporary surge within the regulator which will cause abnormal temporary readings on the air gage glass.

BRIEF DESCRIPTION OF THE INVENTION

It is therefore an object of the present invention to eliminate the use of the pressure regulator in this type of gage and replace it with an air flow control mechanism which will automatically provide the transistion of high pressure air in a high pressure chamber to an intake chamber at a uniform low pressure in the range of 10–25 PSI.

It is another object by eliminating the pressure regulator to save the vast space theretofore occupied thereby and at the same time, provide a more efficient means of controlling air flow and in turn, providing for the reduced uniform low pressure air flow for the gaging operation.

It is another object to provide an air flow control device which will permit the automatic draining of any accumulated oil and water without passing the same through the main body of the air gage.

It is another object to provide automatic air flow control which assures the constant and uniform flow of low pressure air to the intake chamber regardless of any pressure build up or temporary pressure surge in the low pressure chamber of the air flow device bleeding the same to atmosphere rather than through the gaging system.

These and other objects will be seen from the following specification and claims in conjunction with the appended drawings.

THE DRAWINGS:

FIG. 2 is a fragmentary right side elevational view thereof;

FIG. 3 is a left side elevational view thereof taken essentially on line 3—3 of FIG. 1, and illustrating the side support plates;

FIG. 4 is a vertical section on an enlarged scale of the automatic air flow control device of FIG. 1.

DETAILED DESCRIPTION

Figure 1:
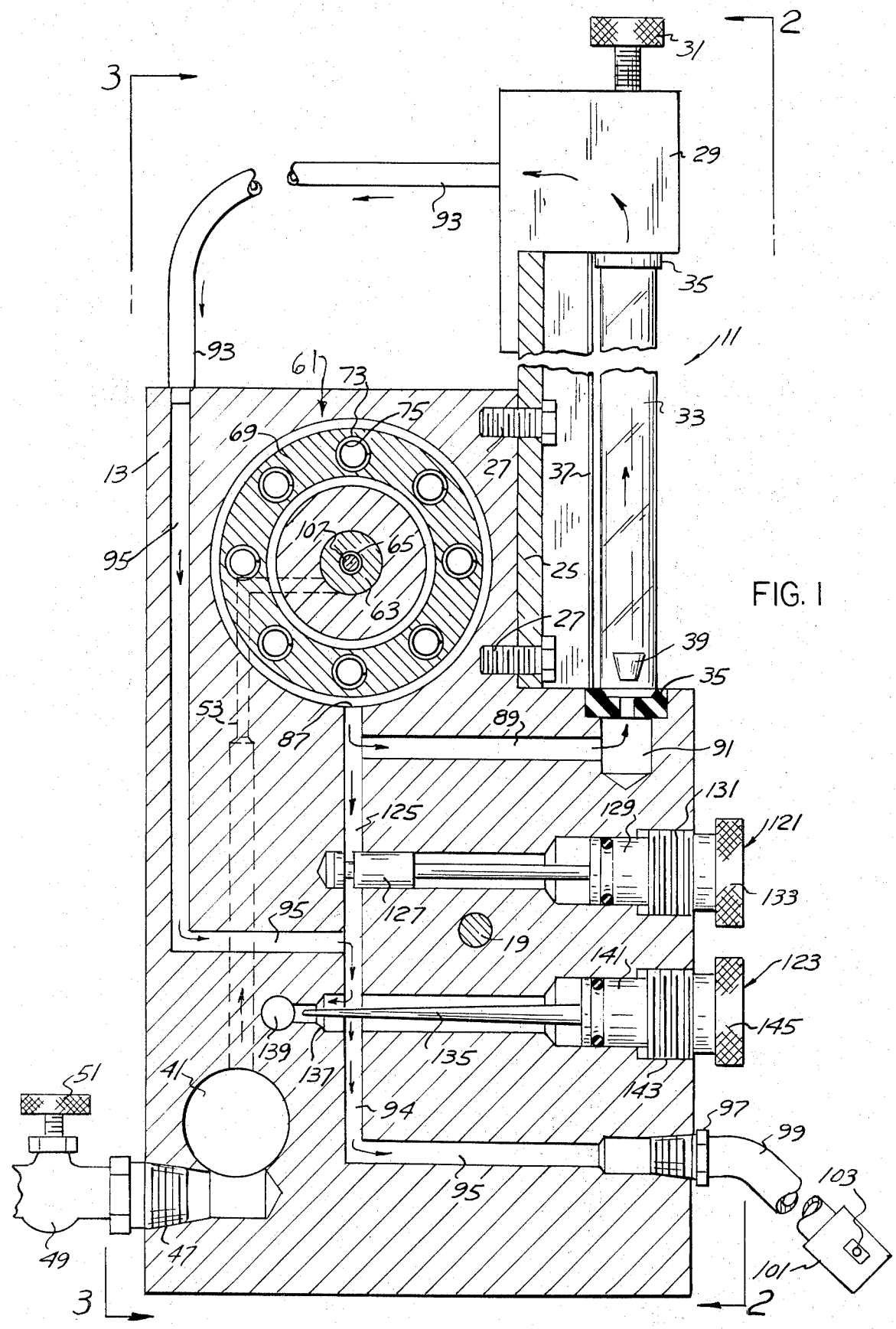
FIG. 1 is a side elevational view of the body of the present air flow gaging device partly broken away and sectioned.

Referring to the drawings, the present air flow air leakage gaging device is to a great extent, similar to the air gage of my U.S. Pat. No. 3,170,318 dated Feb. 23, 1965.

Among other improvements whereas, the original air gage employed a pressure regulator for reducing high pressure air at approximately 100 PSI to working gaging air flow pressure in the range of 12 PSI, the present improvement eliminates the pressure regulator. In connection with the present improved and simplified construction, low pressure air is provided by an automatic air flow control device which will accomplish the same result but omits all the disadvantages of pressure regulators and is an improvement thereover.

The present air gage 11, FIG. 1, has a unit body 13 and has arranged upon opposite sides thereof a pair of opposed side support plates 15 and 17 in snug registry with said body from top to bottom and secured thereto by a single bolt 19 and a pair of fasteners 21. Gage anchoring apertures 23 are formed through the side support plates as shown in FIG. 3.

The upright pedestal 25 is mounted on and secured to an upper cut away front portion of the body by fasteners 27 and at its upper end includes air tube support 29 with air tube support clamp 31, FIG. 2.

The yieldable glass tube seal seat 35, preferably of rubber or the like, is nested within the body, FIG. 1, and is adapted to supportably receive the lower end of the upwardly and outwardly tapered air tube 33. Its upper end is correspondingly joined and sealed to a similar resilient seal seat in the undersurface of the air tube support for the delivery of low pressure air through the air tube upwardly thereof and out through conduit 93, FIGS. 1 and 2.

A scale 37 with suitable indicia shown, FIG. 2, is applied to one side of the pedestal adjacent the air tube to provide for the visual reading of the longitudinal position within said air tube of the float 39 during the gaging operation of the present air flow leakage gaging device.

Manifold 41 is provided through the lower portion of said body. Its open ends are closed and sealed by the O-rings 43 and 45 within the respective portions of the body and one of the side support plates as shown in FIG. 2. Said manifold is connected to an inlet port 47 in the body adapted to receive the high pressure air inlet fitting 49, fragmentarily shown, and which includes cut off valve 51.

Said manifold has an outlet which through passage 53, is connected to high pressure chamber 55 within said body and forming a part of the present automatic air flow control device. Said air flow control device includes the low pressure chamber 57 defined by the cylindrical bore 59 within said body and piston 69. The air flow control device is generally indicated at 61, FIG. 4, on an increased scale for clarity.

Valve seat 63 is nested and sealed within high pressure chamber 55 and has a longitudinal bore 65 therethrough terminating in counterbore 67.

The cylinder 59 is of ring shape generally and loosely positioned therein is a ring shaped piston 69.

O-ring seal 71 extends around and is retainingly engaged by said piston and interposed between said piston and the wall of cylinder 59 for sealing the low pressure chamber therebetween as shown in FIG. 4. A series of spaced axial bores 73 extend into said piston from one side and arranged in a circle, adapted to receive and nest and support a series of compression springs 75. These springs extend outwardly of said piston for operative engagement with removable retainer plate 77 anchored within one side of the valve body by a series of set screws 79. Said retainer plate is centrally apertured at 81 for the escape of air to atmosphere as may be required during the normal operation of the air flow device.

As best shown in FIG. 4, there is defined between a portion of the wall of the body which defines the cylinder and the piston, a circular low pressure chamber 83 which communicates with the circular low pressure chamber 85, in turn, communicating with the low pressure chamber 57 connected to the cylinder outlet 87. Said outlet through passage 89 is connected to low pressure intake chamber 91, FIG. 1.

Due to the functioning of the present automatic air control device, high pressure air in the range of 100–200 PSI has been converted and is delivered through passage 89 into the low pressure intake chamber 91 at approximately 12 PSI for delivery up through glass tube 33. As shown in FIG. 2, the low pressure air after flowing through the transparent tube, passes through the air tube support 29 and through the flexible return conduit 93 which joins delivery passage 95 in said body, FIGS. 1, 2 and 3, which outlets in the front face of the said body.

Suitable air gage tooling is adapted for connection to the outlet of delivery passage 95. This tooling includes fitting 97, the flexible elongated conduit 99, fragmentarily shown, which terminates in the cylindrical gage element 101 having suitable air orifices 103.

The exact functioning and operation of the air gage is the same as disclosed in much further detail in Minix U.S. Pat. No. 3,170,318 above, and the full detail of which is omitted herein.

As a part of the present automatic air flow control device, there is adjustably positioned within the piston 69 centrally thereof, the apertured final adjustment screw 105 against which registers the secondary valve face 111 of needle valve 107. Said valve is spring biased in one direction thereagainst by compression spring 119 within high pressure chamber 55, FIGS. 3 and 4.

The needle valve is shown on an enlarged scale in FIG. 4 and includes a body 109 and intermediate its ends, a secondary valve face 111 and the primary valve face 115 spaced therefrom. One end portion of the valve body is tapered to supportably receive needle valve biasing spring 119.

Elongated tip 113 of reduced dimension projects from one end of said body outwardly of the secondary valve face 111 and is loosely positioned through the aperture in the final adjustment screw 105.

In normal operation, due to the pressure of the series of compression springs 75, said piston is urged to the left of FIG. 4 so that the secondary valve face 111 is normally seated loosely against the final adjusting screw 105. Though seated, it is possible for limited amounts of air to pass through the final adjusting screw out through the aperture 81 in spring retainer plate 77.

OPERATION

In the operation of the present device, the piston 69 is spring biased inwardly and bears against the secondary valve face 111 so as to hold the primary valve face 115 off of its corresponding valve seat 63 to permit the passage of high pressure air from the high pressure chamber 55 into the reduced dimension low pressure chamber 57.

Thus, the present automatic air flow control device in controlling the volume of high pressure air flowing past the needle valve determines the low pressure of air within chambers 83, 85 and 57 and for the delivery of low pressure air through outlet 87 and pasage 89 to the low pressure intake chamber 91 of FIG. 1.

The position of the parts in FIG. 4, though exaggerated, for illustration, is the normal positioning of the needle valve when high pressure air has been introduced into the high pressure chamber 55. Slight movements of the needle valve responding to changing pressure conditions, provide an automatic control of air passing through the valve seat 63, thus, delivering low pressure air into chamber 57.

In the event of a surge of air pressure produced, for example, by either an interruption in the force of air under pressure or closing off the gaging element of the tooling, there will be a momentary build up of pressure within the low pressure chamber. This will act against the springs 75 causing such movement of the piston to the right, FIG. 4, as will permit seating of the needle valve primary valve face 115 with respect to the valve seat and at the same time, the unseating of the secondary valve face 111, with respect to the final adjusting screw. This permits the build up of excess air pressure to pass outwardly through said adjusting screw and through the retainer plate to atmosphere without creating any surge in the low pressure delivery line and in the low pressure chamber 91.

Though not a part of the present invention, and as a refinement of the present air bleed gaging device described in much further detail in U.S. Pat. No. 3,170,318 there is provided bypass valve 121, FIGS. 1 and 2, and the air bleed valve 123, both adjustably nested and positioned in the valve body.

BY-PASS VALVE

The bypass valve includes longitudinally adjustable valve element 127 connected to cylindrical shank 129 which terminates in the threaded body 131 and its knurled handle 133. The bypass valve element 127 has an annular groove therein which partly and adjustably extends into the pasage 125 in said valve body, FIG. 1, which communicates with outlet 87.

By variably adjusting the bypass valve 121, some of the low pressure air which is delivered from outlet 87 will be diverted from the low pressure intake chamber 91 and will travel through the passage 125, which is in communication with delivery passage 95. As the gage element 101 becomes worn, the amount of air leakage increases, with a decrease in the range of visible gaging movement of float 39. In order to increase the range, the bypass valve is adjusted to decrease the amount of air bypassed.

AIR BLEED VALVE

The bleed valve 123, FIG. 1, includes the elongated tapered needle valve element 135 which extends through passage 125 into and relative to seat 137 which is apertured and which communicates with outlet 139 to atmosphere. This provides a means by which some of the air which has been bypassed through passage 125 instead of flowing through the delivery passage 95 will be bled out to the atmosphere. This provides a means of zeroing in the controls, in a manner more fully described in U.S. Pat. No. 3,170,318, which forms no part of the present invention. The bleed valve provides a means for adjusting the level of float 39 in tube 33.

The needle valve element 135 terminates in a shank 141 which merges with threaded body 143 within said main valve body controlled by handle 145.

Having described my invention, reference should now be had to the following claims.

I claim:

1. In an air flow device for gaging bores or the predetermined dimension of a part, wherein air leakage from a gage element within a bore or relative to such part is visibly measured and compared with air leakage from said gage element within a predetermined master bore or part of predetermined dimension, thus providing a range for the selection or rejection of workpieces; the invention comprising:

a valve body having an intake chamber and a delivery passage adapted for connection to air gage tooling;

an air tube support on and above the valve body;
an upright transparent air flow tube interposed between the valve body and the support in communication with said intake chamber;
a conduit interconnecting said tube support and said delivery passage receiving air from the air tube;
an air float movable in said air tube;
an air manifold in said body adapted for connection to a source of high pressure air and having an outlet;
an automatic air flow control device in said body having an inlet connected to the manifold outlet, and an outlet connected to said intake chamber for delivering low pressure air thereinto;
said air flow control device comprising a cylinder in said body;
a piston movable and sealed within said cylinder defining a low pressure air chamber;
spring means interposed between said piston and valve body;
there being a high pressure chamber in said body connected to said manifold;
an apertured valve seat in said high pressure chamber adapted for communication with said low pressure chamber;
and a spring biased needle valve in said high pressure chamber loosely extending through said seat and yieldably engaged by said piston;
said spring means normally maintaining the needle valve unseated for delivery of uniform low pressure air to said low pressure chamber;
said cylinder and piston being of ring shape.

2. In the air flow device of claim 1, said high pressure air being in the range of 75-125 PSI approximately, and said low pressure air being in the range of 10-20 PSI approximately.

3. In the air flow device of claim 1, said piston being loosely nested in said cylinder and adapted for limited longitudinal and rocking movement therein;
the seal between said cylinder and piston including an O-ring around and retainingly engaged by said piston.

4. In an air flow device for gaging bores or the predetermined dimension of a part, wherein air leakage from a gage element within a bore or relative to such part is visibly measured and compared with air leakage from said gage element within a predetermined master bore or part of predetermined dimension, thus providing a range for the selection or rejection of workpieces; the invention comprising:

a valve body having an intake chamber and a delivery passage adapted for connection to air gage tooling;

an air tube support on and above the valve body;
an upright transparent air flow tube interposed between the valve body and the support in communication with said intake chamber;
a conduit interconnecting said tube support and said delivery passage receiving air from the air tube;
an air float movable in said air tube;
an air manifold in said body adapted for connection to a source of high pressure air and having an outlet;
an automatic air flow control device in said body having an inlet connected to the manifold outlet, and an outlet connected to said intake chamber for delivering low pressure air thereinto;
said air flow control device comprising a cylinder in said body;
a piston movable and sealed within said cylinder defining a lower pressure air chamber;
spring means interposed between said piston and valve body;
there being a high pressure chamber in said body connected to said manifold;
an apertured valve seat in said high pressure chamber adapted for communication with said low pressure chamber;
and a spring biased needle valve in said high pressure chamber loosely extending through said seat and yieldably engaged by said piston;
said spring means normally maintaining the needle valve unseated for delivery of uniform low pressure air to said low pressure chamber; and
an apertured final adjustment screw in said piston engaging said needle valve.

5. In the air flow device of claim 4, said needle valve having a tapered primary valve face intermediate its ends adapted for registry with said valve seat and normally unseated; and a secondary valve face on said needle valve adapted for normal seating registry with said final adjustment screw; whereby any momentary build up of pressure in said low pressure chamber acts against said piston moving the same to seat said primary valve face and unseat the secondary valve face with excess pressure air passing through said final adjustment screw to atmosphere.

6. In the air flow device of claim 5, said needle valve having a reduced end portion loosely nested within said final adjustment screw.

7. In an air flow device for gaging bores or the predetermined dimension of a part, wherein air leakage from a gage element within a bore or relative to such part is visibly measured and compared with air leakage from said gage element within a predetermined master bore or part of predetermined dimension, thus providing a range for the selection or rejection of workpieces; the invention comprising:

a valve body having an intake chamber and a delivery passage adapted for connection to air gage tooling;

an air tube support on and above the valve body;

an upright transparent air flow tube interposed between the valve body and the support in communication with said intake chamber;

a conduit interconnecting said tube support and said delivery passage receiving air from the air tube;

an air float movable in said air tube;

an air manifold in said body adapted for connection to a source of high pressure air and having an outlet;

an automatic air flow control device in said body having an inlet connected to the manifold outlet, and an outlet connected to said intake chamber for delivering low pressure air thereinto;

said air flow control device comprising a cylinder in said body;

a piston movable and sealed within said cylinder defining a lower pressure air chamber;

spring means interposed between said piston and valve body;

there being a high pressure chamber in said body connected to said manifold;

an apertured valve seat in said high pressure chamber adapted for communication with said low pressure chamber;

and a spring biased needle valve in said high pressure chamber loosely extending through said seat and yieldably engaged by said piston;

said spring means normally maintaining the needle valve unseated for delivery of uniform low pressure air to said low pressure chamber;

said spring means including a series of spaced compression springs arranged in a circle nested in said piston and interposed between said piston and valve body.

8. In the air flow device of claim 7, the valve body outwardly of said piston having a circular opening therein; and an apertured retainer plate nested and secured in said opening engaging said springs.

* * * * *